US005225257A

United States Patent [19]
Brant

[11] Patent Number: 5,225,257
[45] Date of Patent: Jul. 6, 1993

[54] FLUORINE TREATMENT OF STRETCH/CLING FILMS

[75] Inventor: Patrick Brant, Seabrook, Tex.

[73] Assignee: Exxon Chemical Patents Inc, Linden, N.J.

[21] Appl. No.: 893,282

[22] Filed: Jun. 4, 1992

[51] Int. Cl.$^5$ ............................................. B65B 53/00
[52] U.S. Cl. .................................... 428/34.9; 428/421;
  428/522; 428/516; 428/520; 525/240;
  156/244.11
[58] Field of Search ....................... 428/34.9, 421, 522,
  428/516, 520; 525/240; 156/244.11

[56] References Cited

U.S. PATENT DOCUMENTS

| | | | |
|---|---|---|---|
| 3,508,944 | 4/1970 | Henderson | 264/95 |
| 3,647,613 | 3/1972 | Scotland | 220/457 |
| 3,740,325 | 6/1973 | Manion | 204/169 |
| 3,817,821 | 6/1974 | Gallini . | |
| 4,027,646 | 6/1977 | Sweeton | 124/56 |
| 4,082,877 | 4/1978 | Shadle | 428/220 |
| 4,147,827 | 4/1979 | Breidt, Jr. | 428/218 |
| 4,189,420 | 3/1980 | Sugimoto et al. | 260/31.6 |
| 4,194,039 | 3/1980 | Mueller | 428/213 |
| 4,264,750 | 4/1981 | Anand | 525/356 |
| 4,303,710 | 12/1981 | Bullard | 428/212 |
| 4,364,981 | 12/1982 | Horner | 428/213 |
| 4,399,180 | 8/1983 | Briggs | 428/212 |
| 4,404,256 | 9/1983 | Anand | 428/409 |
| 4,418,114 | 11/1983 | Briggs | 428/212 |
| 4,425,268 | 1/1984 | Cooper | 428/218 |
| 4,436,788 | 3/1984 | Cooper | 524/110 |
| 4,504,434 | 3/1985 | Cooper | 428/483 |
| 4,518,654 | 5/1985 | Eichbauer | 428/516 |
| 4,588,650 | 5/1986 | Mientus | 264/22 |
| 4,671,987 | 6/1987 | Knott, II | 428/216 |
| 4,743,419 | 5/1988 | Bierschenk | 264/82 |
| 4,889,675 | 12/1989 | Chiuminatta | 264/154 |

FOREIGN PATENT DOCUMENTS

| | | |
|---|---|---|
| 198091 | 7/1985 | European Pat. Off. . |
| 2031801 | 11/1970 | France . |
| 2123747 | 10/1982 | United Kingdom . |

Primary Examiner—Edith Buffalow
Attorney, Agent, or Firm—D. L. Lundeen; Catherine L. Bell; Myron B. Kurtzman

[57] ABSTRACT

A thermoplastic film is provided which is especially suited for use in stretch/cling applications such as, for example, the bundling, packaging and unitizing of foods and other goods. The film comprises a cling layer comprising a polymer of at least ethylene and acrylate and a non-cling layer comprising a polyolefin. One or both surfaces of the film are partially fluorinated to substantially increase the film cling and inhibit blocking.

20 Claims, No Drawings

FLUORINE TREATMENT OF STRETCH/CLING FILMS

FIELD OF THE INVENTION

The present invention relates generally to thermoplastic films and, more particularly, to partially fluorinated thermoplastic films having properties making them especially well suited for use as stretch/cling wraps in various bundling, packaging and palletizing operations.

BACKGROUND OF THE INVENTION

Stretch/cling films have found utility in a wide variety of fields including the bundling and packaging of food and other goods. One application of particular, but not limiting, interest to the present invention is in the bundling of goods for shipping and storage such as, for example, the bundling of large rolls of carpet, fabric or the like for shipping from the manufacturer to a retail outlet. An important subset of these bundling applications is in the containment and unitizing of pallet loads.

The load of a pallet may be unitized or "bundled" by stretch-wrapping a film several times around the articles to be palletized. There exist a variety of stretch-wrapping techniques, two of which are commonly employed. In one technique, the loaded pallet is placed on a rotating turntable and the end of a continuous roll of film attached to the load. As the turntable rotates, the film is continuously wrapped around the pallet and load. Tension is applied to the film roll to cause the film to stretch as it is applied.

Because the film is in a stretched condition, it is placed under considerable tension and will have a tendency to return to its original, unstretched state. This tension can cause the film to unravel from the wrapped pallet, thereby jeopardizing the integrity of the unitized load. It is desirable, therefore, that the film have cling properties to prevent unraveling of the film from the pallet. The tension in the stretched film may also cause the film to be more susceptible to punctures and tears. It is, therefore, also desirable for the film, as a whole, to have good stretch, tensile, puncture resistance and tear resistance properties. Thermal stability of the various film components is important for the recycling of edge trim and film scrap generated in the various film production processes.

To impart cling properties to, or improve the cling properties of, a particular film, a number of well-known tackifying additives have been utilized. Common tackifying additives include polybutenes, terpene resins, alkali metal stearates and hydrogenated rosins and rosin esters. The use of tackifying additives, however, may not be desirable. These additives have a tendency to accumulate on the stretch wrapping apparatus often requiring additional periodic cleaning and maintenance. They also can migrate into the bundled or unitized articles resulting in damage to such articles, as well as migrating throughout a film, even a multilayer film, causing tackiness on both sides. In palletizing operations, this may cause the film on adjacent pallets to cling together resulting in tear, puncture or other damage to the wrap and jeopardizing the integrity of the unitized load.

For this reason, it is desirable for the film to have slip or "anti-cling" properties on its "outer" side to prevent this interpallet cling. Slip is defined in terms of coefficient of friction. In other words, it is desirable that the "outer" side of the film have a low coefficient of friction in contact with another object, particularly another like film. As with cling, slip can be imparted to the film or improved through the use of various well-known slip, anti-cling and/or antiblock additives including silicas, silicates, diatomaceous earth and various lubricants.

It is also a requirement that the film can be unwound from rolls in which it is often shipped and stored until ready for use, for example, in palletizing operations. Over a period of time, particularly at elevated ambient storage temperatures, the film can block or fuse together in adjacent layers so as to inhibit unwinding by the adjacent layers sticking together, and in severe cases of destructive block, actual tearing or delamination of the film can occur. The conventional anti-cling and slip additives also generally serve to inhibit blocking.

In addition to conventional anti-cling additives, film cling properties can be altered by exposure to a corona discharge. The reactivity of discharge particles can alter the surface chemistry of the film and consequently its physical characteristics. The effect of such exposure can be observed by changes in film surface energy.

A wide variety of thermoplastic polymers such as, for example, polyvinyl chloride, polyethylene, polypropylene and various polymers of ethylene and other comonomers, most notably vinyl acetate, have been used as stretch/cling films. These materials standing alone, however, suffer from a number of shortcomings. Most do not possess desirable cling properties without the use of tackifying additives. Further, most cannot be stretched to a great extent without adversely affecting their cling, slip, tensile, tear resistance and puncture resistance properties. For the particular case of ethylene-vinyl acetate polymers, thermal stability becomes a problem on the reprocessing of trim and scrap.

More recently, the use of multilayer films has gained popularity. With a multilayer film, one can obtain a stretch/cling wrap having cling properties on one side and slip properties on the other side. For example, U.S. Pat. No. 4,518,654 discloses a multilayer film having an A/B construction wherein the A side has cling characteristics and the B side has slip characteristics. In the aforementioned patent, the A side is said to comprise a polyethylene or an ethylenemonoolefin polymer, preferably linear low density polyethylene (LLDPE). To provide the LLDPE with the desired cling properties, a tackifying agent is added to the polymer. The B side is said to comprise a low density polyethylene (LDPE) with an anticling additive added to impart the desired slip properties to the LDPE. This patent is hereby incorporated by reference herein for all purposes as if fully set forth.

Other multilayer films comprising layers of the various aforementioned stretch/cling materials are disclosed in U.S. Pat. Nos. 3,508,944, 3,817,821, 4,022,646, 4,082,877, 4,147,827, 4,189,420, 4,194,039, 4,303,710, 4,399,180, 4,364,981, 4,418,114, 4,425,268, 4,436,788, 4,504,434, 4,588,650 and 4,671,987; U.K. Patent Application 2,123,747; French Patent 2,031,801; and European Patent Application No. 0,198,091, all of which are also incorporated by reference herein for all purposes. These multilayer films are generally produced by one of a number of well-known coextrusion processes also disclosed in the aforementioned incorporated references.

Many of the multilayer films, however, still suffer from shortcomings possessed by their individual layers.

For instance, most still require the use of tackifying additives to impart cling properties to the film. As previously mentioned, these tackifying additives can have a tendency to accumulate on dispensing apparatus and may migrate through the films to the slip side. Also, films containing a tackifying additive may be prepared and used in such a manner that the tackifying additive is "picked off" and onto the slip side of the film because the slip and cling layers of the film are in intimate contact on the film roll. Others do not possess desired slip properties, particularly when in a highly stretched state. Still others do not possess a desirable combination of stretch, tensile, tear resistance, puncture resistance and thermal stability properties.

It is known to treat various polymer surfaces by fluorination. Materials like polytetrafluorethylene (PTFE) have been used extensively and have very low polar surface energies. As an alternative to fluorinated polymers like PTFE which are relatively expensive, localized fluorination at the polymer surface has been used to reduce cost.

U.S. Pat. No. 3,740,325 to Maulon discloses a material and process for making a surface fluorinated material. The treated material is said to have greater water resistance, corrosion and soil resistance and be more like PTFE.

U.S. Pat. No. 3,647,613 to Scotland discloses a surface fluorinated high density polyethylene used for making containers suitable for storing hydrocarbons. The HDPE surface containing a concentration of 0.01 to 30 micrograms of fluorine per square centimeter was said to improve permeability characteristics to gasoline.

U.S. Pat. No. 4,880,675 discloses plastic containers comprising a polyethylene inner layer coextruded with a polypropylene outer layer wherein the inner layer is treated with a reactive fluorine source. Such treatment is said prevent the absorption of flavor or aroma compounds by the container lining.

U.S. Pat. No. 4,743,419 to Bierschenk discloses an on-line method for continuous fluorination of a polymer film while the film is being extruded.

U.S. Pat. Nos. 4,264,750 and 4,404,256 to Anand et al. disclose a process for making fluorinated low energy polymer surfaces by exposure to ions or radicals of fluorinated species in a cold plasma and polymers having a substantially completely fluorinated surface of low surface energy which is substantially oxygen free.

Surface fluorination of high density and low density polyethylene films between 40° C. and 100° C. is described by Volkmann et al. in *Makromolecular Chemie, Macromolecular Symposium*, Vol. 25, pp. 243–248 (1989). The reaction is said to be diffusion controlled with the degree of fluorination increased by greater $F_2$ concentration in the fluorinating gas mixture.

Processes for surface fluorinating polymer films have been observed to introduce oxygen into the surface as a reaction byproduct when reaction times are smaller than those required to achieve complete surface fluorination. Anand et al. attributes this fact to a post-reaction with atmospheric oxygen or oxygen impurities possibly due to radicals trapped in the subsurface or some unreacted bonds on the surface. At any rate, this phenomenon is not generally observed following complete surface fluorination.

The presence of oxygen following a partial fluorination of a polymer surface increases surface energy, particularly the polar component, making the surface more adherent. Milker and Koch, "Surface Pretreatment of Polymer webs by Means of Fluorine; and Milker and Koch, "Fluorine Makes Plastics Flexible"; describe a fluorination process for producing polymer films said to have good adhesion properties. The process is said to alter the surface on a more or less permanent basis so that the polar character of the material is increased.

SUMMARY OF THE INVENTION

The present invention resides in part in the discovery that both the antiblock and cling properties of an ethylene-acrylate copolymer stretch/cling film are surprisingly enhanced following partial fluorination of one or both exterior surfaces of the film. Complete fluorination has been known to produce low surface tension films having excellent slip properties, whereas partial fluorination has been known to increase the hydrophilic properties of a polymer surface (including adhesiveness) by catalyzing surface oxygenation when the surface is subsequently exposed to air. Therefore, a fluorination treatment for stretch/cling film which both increases cling and reduces block is contrary to what would have been generally expected since antiblock and cling are generally opposing properties. Broadly the treatment comprises exposing one or both surfaces of the film to a dilute mixture of a fluorination species in a carrier gas for a time period less than that required to achieve complete surface fluorination and subsequently exposing the partially fluorinated film surface to the air. This discovery has led to stretch/cling films suitable for packaging and pallet unitization which have excellent cling and good resistance to block.

As a consequence of the fluorine cling-enhancing treatment which also inhibits blocking tendency, the present invention provides a thermoplastic film having excellent cling properties, even without the use of a tackifying additive. In fact, it is desired with the present invention to omit the use of such tackifying additives, in one embodiment, such that a cling layer is essentially free of tackifier.

The present invention further provides a multilayer stretch/cling film having excellent cling properties on one side and excellent slip properties on an opposite side, even in a highly stretched state.

Still further, the present invention provides a multilayer stretch/cling film which, as a whole, possesses desirable stretch, tensile strength, puncture resistance, tear resistance and thermal stability properties.

Finally, the present invention provides a process for producing such a stretch/cling film, a process for using such stretch/cling film to bundle, package or unitize an article or a plurality of articles, and an article or plurality of articles so bundled, packaged or unitized.

In accordance with the present invention, there is provided a multilayer thermoplastic stretch film comprising, in its overall concept, a cling layer and a non-cling layer, wherein one or both surfaces of the layers are partially fluorinated, preferably the surface of the non-cling layer. The cling layer comprises a polymer of two or more monomers, wherein a first monomer comprises ethylene and a second monomer comprises an acrylate. Such polymer shall generally be referred to as an ethylene-acrylate (or EA) polymer. More particularly, the EA polymer comprises an acrylate content of between about 2% to about 40%, more preferably between about 10% to about 35%, most preferably between about 20% to about 30%, by weight based upon the weight of the EA polymer. A tackifying additive may optionally be added to the EA polymer to improve its cling, but this is not desired and is preferably omitted such that the EA polymer is essentially free of tackifying additives. The non-cling layer preferably comprises a slip layer of any suitable polyolefin such as, for example, polyethylene (including high density, medium density and low density and linear low density polyethylenes), polypropylene, etc. Preferred are medium density polyethylene (MDPE), linear low density polyethylene (LLDPE) and polypropylene (PP). Additionally, the slip side may include one or more well-known anticling (slip and/or antiblock) additives, but the slip layer is preferably partially surface fluorinated and essentially free of anticling additives. The cling layer will preferably comprise from about 5% to about 95%, and the non-cling layer will preferably comprise from about 95% to about 5%, of combined thickness of the cling and non-cling layers.

One or both exterior surfaces of the film are partially fluorinated, preferably the exterior surface of the non-cling layer, to substantially increase cling and inhibit the block of the film, wherein the fluorination reaction catalyzes an oxygenation by-reaction upon exposure to air. The film is preferably fluorinated by exposing the surface first to a mixture of molecular fluorine gas in a carrier gas for a time period less than that required to achieve complete fluorination and then to air. The surface may have a fluorine:carbon surface stoichiometry of from about 0.001 to about 0.5, preferably from about 0.01 to about 0.15. An oxygen:carbon surface stoichiometry is preferably at least about 0.10.

The multilayer thermoplastic stretch film of the invention may be so constructed to further include an intermediate structural layer (second layer) separating a cling first layer and a non-cling third layer. The cling first layer comprises a polymer of two or more monomers, wherein a first monomer comprises ethylene and a second monomer comprises an acrylate. The structural second layer may comprise a suitable polyolefin depending on the film application. The non-cling third layer preferably comprises a slip layer of any suitable polyolefin as previously mentioned wherein MDPE, LLDPE and PP are preferred. One or both exterior surfaces of the film is partially fluorinated, but preferably the exterior surface of the non-cling layer, to substantially increase cling and inhibit the block of the film. The structural second layer comprises from about 5% to about 95% of the weight of the film, preferably at least about 50%, and more preferably at least from about 70% to about 80% of the weight of the film.

These and other features and advantages of the present invention will be more readily understood by those skilled in the art from reading the following detailed description.

DETAILED DESCRIPTION OF THE INVENTION

Thermoplastic films produced in accordance with the present invention have excellent cling properties on the cling layer and slip properties on the non-cling layer. Particularly, the use of tackifying additives can be avoided because of the excellent cling properties of the cling layer EA polymer against a partially fluorinated non-cling surface. The treatment while enhancing the cling property of the stretch/cling film does not, however, substantially increase the tendency to block, and generally a substantial decrease in the block is found. The present thermoplastic films, as a whole, additionally have desirable stretch, tensile, puncture resistance and tear resistance properties. Further, the thermoplastic materials used for the cling and non-cling layers have excellent thermal stability, and edge trim scrap can be processed without significant loss of film performance. This combination of properties makes the thermoplastic films of the present invention especially well suited for use as stretch/cling wraps.

The thermoplastic film, in its overall concept, comprises a cling layer and a non-cling layer, wherein one or both of the exterior surfaces is partially fluorinated. The cling layer comprises a polymer of two or more monomers, wherein a first monomer comprises ethylene and a second monomer comprises an acrylate. Acrylate, in the singular, refers to both a single acrylate and combinations of different acrylates. These polymers will generally be referred to as ethyleneacrylate (or EA) polymers.

Acrylates useful in the present invention are those of the general formula:

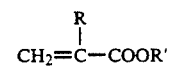

wherein R is selected from hydrogen or a hydrocarbon group having from 1 to 22 carbon atoms, preferably an alkyl, aryl, aromatic, olefin or the like hydrocarbon group and wherein R' is selected from the same or different of these hydrocarbon groups.

Preferred acrylates comprise those wherein R is selected from hydrogen or an alkyl group and wherein R' is the same or different of such alkyl group. Specific examples of preferred acrylates include methyl acrylate, ethyl acrylate, propyl acrylate, n-butyl acrylate, 2-ethylhexyl acrylate, decyl acrylate, octadecyl acrylate, methyl methacrylate, ethyl methacrylate, n-butyl methacrylate and the like. Of these, methyl acrylate is particularly preferred.

In the preferred embodiment, the EA polymer comprises an acrylate content of between about 2% to about 40%, more preferably between about 10% to about 35%, most preferably between about 20% to about 30%, and especially between about 24% to about 28% by weight based upon the weight of the EA polymer. The EA polymer may have a wide range of melt indexes (MI), generally between about 0.1 to about 30 dg/min, more preferably between about 1 to about 10 dg/min (ASTM D-1238, Condition E).

The EA polymer may also comprise one or more free radically polymerizable termonomers. Suitable examples include, but are not limited to, vinyl esters, acrylic acids (i.e. methacrylic and ethacrylic acid), other acrylates, carbon monoxide and the like. These additional termonomers will generally be present in small amounts, usually less than a total of about 10% by weight based upon the weight of the EA polymer.

Optionally, small amounts of tackifying additive may be added to the EA polymer during the polymerization reaction or subsequently blended in to improve the cling properties of the film. A wide variety of tackifying additives are well known in the art including, for example, polybutenes, atactic polypropylenes, terpene resins, hydrogenated rosins, rosin esters and other like hydrocarbon tackifying resins. It should be noted, however, that the aforedescribed EA polymers produce films of sufficient cling so as to not require the use of a tackifying additive. In addition, the cling property is further enhanced by silica treatment of the non-cling surface.

The use of tackifying additives is not desirable and should be avoided. In a preferred embodiment, the EA polymer is essentially free of a tackifying additive.

The cling layer preferably comprises between about 5% to about 95%, more preferably between about 5% to about 35%, most preferably between about 10% to about 20% of the combined thickness of the cling and non-cling layers.

The second layer of the multilayer stretch film comprises a non-cling layer opposite the cling layer. The non-cling layer comprises any suitable polyolefin or combination of polyolefins such as polyethylene, polypropylene, copolymers of ethylene and propylene, and polymers obtained from ethylene and/or propylene copolymerized with minor amounts of other olefins, particularly $C_4$-$C_{12}$ olefins. Particularly preferred are medium density polyethylene (MDPE), polypropylene and linear low density polyethylene (LLDPE), i.e., a copolymer of ethylene with up to about 20% by weight $C_4$-$C_{10}$ olefin(s). Especially preferred olefin comonomers include 1-butene, 1-hexene, 1-octene and 4-methyl pentene-1.

Suitable MDPEs include those having a density in the range of from about 0.92 to about 0.95 g/cc and a wide ranging MI, generally up to about 30 dg/min preferably between about 0.5 to about 10 dg/min.

Suitable LLDPEs include those having a density greater than about 0.900 g/cc more preferably in the range of from about 0.900 to about 0.940 g/cc. The LLDPEs may also have a wide ranging MI, generally up to about 30 dg/min, preferably between about 0.5 to about 10 dg/min.

Suitable polypropylene is normally solid and isotactic, i.e., greater than 90% hot heptane insolubles, having wide ranging melt flow rates of from about 0.1 to about 300 dg/min. As is known, such polypropylene is normally crystalline with a density range of from about 0.89 to about 0.91 g/cc for isotactic polypropylene. Employing polypropylene in the non-cling layer has the additional advantage of imparting abrasion resistance thereto.

The non-cling layer preferably comprises between about 5% to about 95%, more preferably between about 65% to about 95%, most preferably between about 80% to about 90% of the combined thickness of the cling/non-cling layers.

One or both surfaces of the coextruded layers of the film are partially fluorinated to enhance cling and inhibit block. The fluorination reaction catalyzes an oxygenation by-reaction upon exposure to air. The surface to be treated, preferably the surface of the non-cling layer, is exposed to a suitable source of reactive fluorine, such as, for example, fluorine-containing plasmas, fluorine-containing gas mixtures, fluorine dissolved in solvents, UV activated fluorine gas mixtures, and the like. For example, any of the equipment and methodology for fluorination described in Volkman or Milker and Koch can be used. A preferred fluorination method is direct fluorination using a gas mixture of molecular fluorine in an inert carrier gas.

Processes for fluorinating one or both sides of film material in either batch or continuous operations are known. In a continuous process, the film is introduced into a reaction chamber generally having special locks at either end so that the film may be continuously passed through the chamber without permitting gas to escape. The locks typically have a low pressure seal provided by a vacuum pump. Fluorine is metered from compressed cylinders generally pressurized with the diluent gas to achieve higher fill pressure. Gas exiting the reaction chamber is compressed, combined with makeup gas and recycled to maintain a steady gas flowrate through the reactor. An absorber may be used to remove HF byproduct gas from the recycle stream. Very pure nitrogen is provided as flush and diluent gas. Waste fluorine can be catalyzed to hydrogen fluoride then absorbed by an absorbent such as calcium hydroxide.

The duration of the exposure to $F_2$ and air required to obtain the desired enhancement of cling and slip depends on the conditions of exposure, the film composition and properties, $F_2$ concentration, etc. It is important that the fluorination reaction is not permitted to go to completion, i.e. to replace a large percentage of the available hydrogen atoms attached to the carbon backbone. Fluorination is substantially complete if a majority of the available surface hydrogen atoms are substituted for fluorine atoms so that there is relatively little further fluorination upon further continued fluorine exposure. Partial fluorination is indicated by a dispersive surface energy less than the corresponding polar surface energy, in contrast to a surface energy higher than the polar surface energy when complete surface fluorination is achieved.

In general, $F_2$ exposure times of from 1 to 30 minutes are suitable. Subsequent oxygenation of the film surface is generally instantaneous upon exposure to air, although exposure to oxygen can be extended to ensure complete oxygenation without adversely affecting the desirable film properties.

The amount of $F_2$ needed to enhance cling and inhibit block is relatively minor. Cling and block are improved in some instances with a fluorine:carbon surface stoichiometry, as low as 0.001, as determined by X-ray photoelectron spectroscopy (XPS). However, if the fluorine:carbon surface stoichiometry is too high, the surface may not become activated for reaction to oxygen, a low polarity surface is produced and cling is adversely affected. The fluorine:carbon surface stoichiometry is preferably in the range of from about 0.001 to about 0.5, more preferably from abut 0.01 to about 0.15. The amount of oxygen bonds formed by the activated surface depends on surface F/C stoichiometry and the substrate material. For polyethylene, a suitable O/C stoichiometry is about 10% or greater. The extent of surface activation for any given substrate material (as represented by subsequent O/C ratio) is believed to undergo a maximum at a specific degree of surface fluorination (i. e. F/C ratio).

While not wishing to be bound by any particular theory, fluorination is thought to proceed by a radical mechanism by the abstraction of hydrogens. To the extent that some radicals produced do not react during the fluorination, subsequent reactivity with oxygen in the air occurs. Oxygenation increases the polar surface energy which is a measure of hydrophilicity. The radicals can also react with carbons on neighboring chains producing a degree of surface crosslinking. Crosslinking reduces any tendency for interfacial diffusion (i.e. blocking). While it is known to treat a film surface with fluorine to either impart slip (with reduced cling) or enhance cling (with reduced slip) by surface activation with complete, or partial, surface fluorination, respectively, the enhancement of both cling and antiblock in this type of stretch/cling thermoplastic film by fluorine treatment is unexpected.

The film may also include one or more intermediate layers between the cling and non-cling layers for any one of a number of well-known purposes such as, for example, to provide structural support, to modify the overall physical properties balance of the film, to utilize the recycle trim and scrap or to provide a barrier layer to oxygen or other gases. As just indicated, this intermediate layer may comprise the recycle trim and scrap, or may comprise any other suitable polymer. The intermediate layer(s), however, while preferred, is optional and should not be considered a limitation on the present invention.

The film layers of the present invention may, if desired, also include one or more other well-known additives such as, for example, antioxidants, ultraviolet absorbers, antistatic agents, release agents, pigments, colorants or the like; however, this should not be considered a limitation of the present invention.

Additionally, normal trim and scrap from the film production process, or from suitably recovered and reprocessed used stretch/cling or other films, can be recycled into either the cling or non-cling layers, but preferentially to the non-cling layer of a two-layer film or the core structural layer of a three-layer film.

The EA polymers may be produced by any one of a number of well-known processes such as, for example, those described in U.S. Pat. No. 3,350,372, which is incorporated by reference for all purposes as if fully set forth. Generally ethylene and any comonomers such as an acrylate to make an EA copolymer and, if desired, another monomer(s) are metered into, for example, a high pressure autoclave reactor along with any one of a number of well-known free radical polymerization initiators (catalysts) suitable for producing EA polymers. Particularly preferred catalysts include organic peroxides such as, for example, lauroyl peroxide, di-tert butyl peroxide, tert butyl peroxide and various azo compounds. Typically, the catalyst will be dissolved in a suitable organic liquid such as benzene, mineral oil or the like. Ordinarily the catalyst is used at a level of between about 50 to about 20,000 ppm, more preferably between about 100 to about 250 ppm based upon the weight of the monomers.

MDPE, LLDPE and polypropylene may be made by well known Ziegler catalyst processes including gas phase, slurry, solution, and the like and are readily available commercially.

In preparing the thermoplastic stretch/cling films of the present invention, any one of a number of well-known extrusion or coextrusion (in the case of multilayer films) techniques as disclosed in the previously incorporated references may be utilized. As preferred examples, any of the blown or chill roll cast processes as disclosed and described in those references is suitable for use in producing thermoplastic stretch/cling films in accordance with the present invention.

As previously mentioned, the thermoplastic films of the present invention have properties making them especially well suited for use as stretch/cling films, however this use should not be considered a limitation on the present invention. For example, these films can be made into other forms, such as a tape, by any one of a number of well-known cutting, slitting and/or rewinding operations. Physical properties including, but not limited to, tensile strength, tear strength and elongation can be adjusted over wide ranges by altering the resin types and specifications as appropriate to meet the requirements to a given wrapping, bundling or taping application.

For bundling, packaging and unitizing applications, the thermoplastic film of the present invention is stretch-wrapped by any one of a number of well-known procedures (such as those disclosed in the aforementioned incorporated references) around an article or a plurality of articles preferably so that the cling layer faces inside (towards the article) and the non-cling layer faces outside (away from the article). Typical of articles suitable for bundling, packaging and unitizing with the present thermoplastic film include, but are not limited to, various foodstuffs (canned or fresh), rolls of carpet, liquid containers and various like goods normally containerized and/or palletized for shipping, storage and/or display.

The foregoing more general discussion of this invention will be further exemplified by the following specific examples offered by way of illustration and not limitation of the above-described invention.

EXAMPLES

In the following examples, I/O cling is reported as the force in grams required to partially peel apart two strips of film. A first film strip is attached to a 30° inclined plane with the outside (O) surface (non-cling) facing upward. A second 1"×8" strip is placed on top of the first strip with the inside (I) surface (cling) facing downward. Pressure is applied to the second strip to cause the two strips to stick together. If an evaluation of cling under stretched conditions is desired, both film strips are prestretched and allowed to relax before testing. The end of the second strip at the base of the inclined plane is attached, by clip and string, to an apparatus which can exert a strain at a constant rate (Instron 1130). The two strips are then pulled apart at a crosshead speed of 10 cm/min until the aforementioned string is parallel with the base of the inclined plane. The force at this point is reported as cling.

Block is reported as the 180° peel strength of the outside surface (non-cling) of a first film specimen pressed with 200 psi at 154° F. against the inside surface (cling) of a second film specimen for a specified length of time.

The block, cling or slip of multicompositional, multilayer films, refers to properties the film has when in physical contact with itself such as on a roll or a wrapped pallet. Such properties are generally referenced by noting the location of the surfaces or layers in contact (i.e. inside/outside (I/O)).

EXAMPLES 1-2 AND COMPARATIVE EXAMPLES 1-6

A MDPE film was made from a resin having a melt index of 2 and a density of 0.92 g/cc produced in a gas phase reactor. The film was fluorinated using two different degrees of fluorination. One film had high fluorine concentration at the surface and the other a low fluorine concentration. Film surface stoichiometry for O/C and F/C as determined by x-ray spectroscopy (XPS) is given in Table I.

Fluorination was conducted by a commercial fluorination service which is believed to have used a conventional batch apparatus wherein the film substrate was exposed to a gas mixture of molecular fluorine in a pure nitrogen carrier gas for a set period of time in a reactor vessel. The fluorinated films were handled normally in air prior to physical testing.

To illustrate the effect of fluorine treatment on blocking tendency, film interfaces were prepared by pressing together a cling layer surface comprising a 24% EMA film and a non-cling layer surface comprising the fluorinated MDPE described above. The pressing conditions were 200 psi pressure and 158° F. temperature for a set period of time. The blocking tendency was gauged by the peel force required to separate the films. As seen in Table II, interfaces made with both the low and high fluorinated MDPE required very little peel force compared to the film interface lacking a fluorinated surface. Furthermore, the low fluorinated film interface was almost as resistant to blocking as the high fluorinated film interface.

TABLE I

| | | SURFACE STOICHIOMETRY | | | |
|---|---|---|---|---|---|
| | | SURFACE STOI-CHIOMETRY | | SURFACE ENERGY | |
| EXAM-PLE | SUR-FACE | O/C | F/C | DIS-PERSIVE | POLAR |
| 1 | MDPE | 0.17 | 0.021 | 10.1 | 34.8 |
| Comp. 1 | MDPE | 0.061 | 0.938 | 34.3 | 0.1 |

TABLE II

| | BLOCKING TEST RESULTS | | | |
|---|---|---|---|---|
| | FILM INTERFACE | | PRESS | PEEL |
| EXAM-PLE | CLING LAYER | NON-CLING LAYER | TIME (min)$^a$ | FORCE (lb/in.) |
| 2 | UNTREATED EMA (24% MA) | Example 1 | 30 | 0.08 |
| Comp. 2 | UNTREATED EMA (24% MA) | Comp. Example 1 | 30 | 0.01 |
| Comp. 3 | UNTREATED EMA (24% MA) | UNTREATED MDPE | 30 | 0.25 |
| Comp. 4 | UNTREATED EMA (24% MA) | UNTREATED MDPE | 5 | 0.28 |
| Comp. 5 | UNTREATED EMA (24% MA) | UNTREATED MDPE | 60 | 0.37 |
| Comp. 6 | UNTREATED EMA (24% MA) | UNTREATED MDPE | 120 | 0.53 |

$^a$—200 psi/158° F. press conditions

EXAMPLE 3 AND COMPARATIVE EXAMPLES 7–8

Zero % stretch cling was measured for film interfaces prepared similarly to Examples 1-2 and Comparative Examples 1-6. The results were compared to a similar film wherein the interface surface was not fluorinated. As seen in Table III, the film interface (Example 3) having the low fluorine treated surface showed enhanced cling. The film interface (Comp. Example 7) having the high fluorine treated surface had very little cling, as expected.

TABLE III

| | CLING TEST RESULTS | | | |
|---|---|---|---|---|
| | FILM INTERFACE | | CLING (g/in.) | |
| EXAM-PLE | CLING LAYER | NON-CLING LAYER | MAX | "AVERAGE" |
| 3 | UNTREATED EMA (24% MA) | Example 1 | 358 | 288 |
| Comp. 7 | UNTREATED EMA (24% MA) | Comparative Example 1 | 70 | 63 |
| Comp. 8 | UNTREATED EMA (24% MA) | UNTREATED MDPE | 284 | 241 |

The foregoing description of the invention is provided for illustrative purposes. Many variations and modifications of the invention will become apparent to those skilled in the art in view of the foregoing disclosure. It is intended that all such variations and modifications within the scope or spirit of the appended claims be embraced thereby.

What is claimed is:

1. A thermoplastic stretch film, comprising:
   a cling layer comprising a polymer of two or more monomers, wherein a first monomer comprises ethylene and a second monomer comprises an acrylate; and
   a non-cling layer comprising polyethylene or polypropylene, wherein a surface of at least one of said layers is partially fluorinated to a sufficient extent to substantially increase the cling and substantially inhibit the block of the film.

2. The film of claim 1, wherein said fluorinated surface is formed by exposure of said surface to fluorine and to oxygen.

3. The film of claim 1, wherein said surface has a fluorine:carbon surface stoichiometry as determined by X-ray photoelectron spectroscopy of from about 0.001 to about 0.5.

4. The film of claim 3, wherein said fluorination stoichiometry is from about 0.01 to about 0.15.

5. The film of claim 1, wherein said surface has a oxygen:carbon surface stoichiometry as determined by X-ray photoelectron spectroscopy of at least about 0.10.

6. The film of claim 1, further comprising at least one core layer between said cling and non-cling layers.

7. The film of claim 6, wherein said core layer comprises linear low density polyethylene.

8. The film of claim 1, wherein said acrylate monomer comprises from about 2 to about 40 percent by weight of said polymer.

9. The film of claim 1, wherein said acrylate monomer comprises from about 24 to about 28 percent by weight of said polymer.

10. The film of claim 1, wherein said acrylate monomer comprises a compound of the formula:

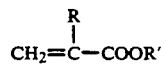

wherein R is selected from hydrogen or a hydrocarbon group having from 1 to about 22 carbon atoms and wherein R' is independently selected from a hydrocarbon group having from 1 to about 22 carbon atoms.

11. The film of claim wherein said acrylate is selected from the group consisting of methyl acrylate, ethyl acrylate and n-butyl acrylate.

12. The film of claim 1, wherein said acrylate comprises methyl acrylate.

13. The film of claim wherein said non-cling layer comprises isotactic polypropylene having a melt flow rate of from about 0.1 to about 300 dg/min.

14. The film of claim 1, wherein said non-cling layer comprises medium density polyethylene having a density from about 0.92 to about 0.95 g/cc and a melt index between about 0.5 to about 10 dg/min.

15. A thermoplastic stretch film, comprising:
   a cling layer of ethylene-methyl acrylate copolymer having a methyl acrylate content of from about 24% to about 28% by weight of said copolymer wherein said cling layer is essentially free of tackifying additive; and
   a non-cling layer comprising a polyolefin and having a partially fluorinated outer surface to substantially increase the I/O cling of the film, said fluorinated surface formed by exposure of said surface to fluorine and to air, wherein said surface has a fluorine:carbon surface stoichiometry as determined by XPS of from about 0.01 to about 0.15.

16. The film of claim 15, wherein said non-cling layer comprises high density polyethylene, medium density polyethylene, low density polyethylene, linear low density polyethylene, polypropylene or a blend thereof.

17. A process for producing a thermoplastic film having a cling layer opposite a second layer, comprising the steps of:
   coextruding a first polymer layer with a second polymer layer, said first polymer comprising two or more monomers, wherein a first monomer comprises ethylene and a second monomer comprises an acrylate, and said second polymer comprises polypropylene or polyethylene; and
   exposing one or both surfaces of said coextruded layers to fluorine and to oxygen to partially fluorinate and oxygenate said surface or surfaces to substantially increase I/O cling of the film and to inhibit block.

18. The process of claim 17 wherein said exposure step is effective to obtain a fluorine:carbon surface stoichiometry from about 0.001 to about 0.5.

19. A bundled, packaged or unitized article or plurality of articles, comprising:
   the article or plurality of articles having the thermoplastic film of claim 1 stretch-wrapped around said article or plurality of articles.

20. A method for the surface protection of an article, comprising the step of:
   covering the surface to be protected on the article with the thermoplastic film of claim 1.

* * * * *